United States Patent
Kawaguchi et al.

(10) Patent No.: US 11,231,327 B2
(45) Date of Patent: Jan. 25, 2022

(54) METHOD FOR CALIBRATING MICROWAVE RADIOMETER

(71) Applicant: ELECS INDUSTRY CO., LTD., Kawasaki (JP)

(72) Inventors: Noriyuki Kawaguchi, Tokyo (JP); Tadashi Takano, Tokyo (JP); Kensuke Ozeki, Kawasaki (JP); Yuichi Chikahiro, Kawasaki (JP); Kenichi Harada, Kawasaki (JP)

(73) Assignee: ELECS INDUSTRY CO., LTD., Kawasaki (JP)

(*) Notice: Subject to any disclaimer, the term of this patent is extended or adjusted under 35 U.S.C. 154(b) by 0 days.

(21) Appl. No.: 17/053,118

(22) PCT Filed: Jul. 1, 2019

(86) PCT No.: PCT/JP2019/026158
§ 371 (c)(1),
(2) Date: Nov. 5, 2020

(87) PCT Pub. No.: WO2020/009070
PCT Pub. Date: Jan. 9, 2020

(65) Prior Publication Data
US 2021/0239536 A1     Aug. 5, 2021

(30) Foreign Application Priority Data
Jul. 2, 2018 (JP) .............................. JP2018-125788

(51) Int. Cl.
*G01K 15/00* (2006.01)
*G01J 5/52* (2006.01)
(Continued)

(52) U.S. Cl.
CPC ............ *G01J 5/522* (2013.01); *G01K 11/006* (2013.01); *G01J 2005/0048* (2013.01)

(58) Field of Classification Search
USPC .......................... 374/1, 2, 121, 122; 250/250
See application file for complete search history.

(56) References Cited

U.S. PATENT DOCUMENTS

| 5,176,146 A | 1/1993 | Chive et al. |
| 6,217,210 B1 | 4/2001 | Roeder et al. |
| (Continued) | | |

FOREIGN PATENT DOCUMENTS

| JP | 58-9031 A | 1/1983 |
| JP | 62-153720 A | 7/1987 |
| (Continued) | | |

OTHER PUBLICATIONS

International Search Report dated Sep. 24, 2019, issued in counterpart International Application No. PCT/JP2019/026158 (2 pages).
(Continued)

*Primary Examiner* — Lisa M Caputo
*Assistant Examiner* — Nasir U. Ahmed
(74) *Attorney, Agent, or Firm* — Westerman, Hattori, Daniels & Adrian, LLP

(57) ABSTRACT

Provided is a method of calibrating a microwave radiometer, which eliminates use of liquid nitrogen as a calibration source. The method is applied to a microwave radiometer configured to receive, by a receiver having a primary radiator connected thereto, a radio wave emitted from an object to be measured depending on a temperature of the object to be measured and to measure a brightness temperature of the object to be measured from an output signal of the receiver. In the method, the method a noise temperature $T_{rx}$ of the receiver appearing on an output side of the receiver is calibrated by observing a plurality of calibration sources having known brightness temperatures. The method includes using a radio wave reflector configured to totally
(Continued)

reflect noise radiated from an input side of the receiver as one of the plurality of calibration sources.

6 Claims, 2 Drawing Sheets

(51) Int. Cl.
   *G01K 11/00* (2006.01)
   *G01J 5/00* (2006.01)

(56) References Cited

U.S. PATENT DOCUMENTS

| | | | |
|---|---|---|---|
| 6,788,244 B1* | 9/2004 | Tam | G01S 7/38 324/629 |
| 7,052,176 B2* | 5/2006 | Stephan | G01K 11/006 374/122 |
| 7,121,719 B2* | 10/2006 | Lee | G01K 11/006 374/122 |
| 7,902,836 B2* | 3/2011 | Kaehs | G01R 27/04 324/637 |
| 8,157,442 B2* | 4/2012 | Van de Velde | G01K 11/006 374/173 |
| 8,497,689 B1* | 7/2013 | Tsironis | G01R 27/32 324/642 |
| 2005/0053118 A1 | 3/2005 | Stephan et al. | |
| 2006/0114965 A1* | 6/2006 | Murphy | G01K 11/006 374/120 |
| 2012/0179048 A1 | 7/2012 | Mawhinney et al. | |

FOREIGN PATENT DOCUMENTS

| | | |
|---|---|---|
| JP | 10-160774 A | 6/1998 |
| JP | 10-227818 A | 8/1998 |
| JP | 2001-506363 A | 5/2001 |
| JP | 2004-28731 A | 1/2004 |

OTHER PUBLICATIONS

Notification of Reasons for Refusal dated Jun. 2, 2020, issued in counterpart JP Patent Application No. 2020-513936, w/English translation (10 pages).

Notification of Reasons for Refusal dated Jul. 15, 2020, issued in counterpart JP Patent Application No. 2020-513936, w/English translation (5 pages).

Decision to Grant a Patent dated Jul. 29, 2020, issued in counterpart JP Patent Application No. 2020-513936, w/English translation (6 pages).

* cited by examiner

METHOD FOR CALIBRATING MICROWAVE RADIOMETER

TECHNICAL FIELD

The present invention relates to a microwave radiometer configured to measure a brightness temperature of an object, and more particularly, to a method of calibrating the microwave radiometer in order to correctly obtain a brightness temperature of an object to be measured.

BACKGROUND ART

A microwave radiometer is a measurement device to be used to obtain brightness temperatures of an object, a ground surface, a sea surface, an atmosphere, and the like. The object, the ground surface, the sea surface, the atmosphere, and the like radiate radio waves in proportion to temperatures thereof. Therefore, the brightness temperatures can be obtained by measuring intensities of the radio waves. In a measurement method by the microwave radiometer, after the radio wave radiated from an object to be measured is received by a receiver, a power density of a signal output from the receiver is highly precisely measured, and the brightness temperature of the object to be measured is output based on the power density.

Meanwhile, in the microwave radiometer, it is difficult to avoid an occurrence of noise in the receiver including an amplifier, and a power density of the noise is always superimposed as a noise temperature on the power density of the signal output from the receiver. Therefore, in order to precisely obtain the brightness temperature of the object to be measured, it is required to subtract the noise temperature of the receiver from the brightness temperature of the object to be measured indicated by the output signal of the receiver. However, the noise temperature fluctuates depending on an ambient temperature of the microwave radiometer and time, and hence, in order to correctly obtain the brightness temperature of the object to be measured, it is required to appropriately obtain a change in noise temperature, to thereby appropriately calibrate the microwave radiometer.

As a method of calibrating a microwave radiometer, there is publicly known a method involving using a calibration source having a known brightness temperature to measure a power density of a radio wave emitted by the calibration source and perceiving the noise temperature of the receiver from a difference between a brightness temperature indicated by the power density and an actual brightness temperature. Moreover, in order to precisely obtain the noise temperature of the receiver, as the calibration source, there are used two types of calibration sources, that is, a cold calibration source indicating a brightness temperature at a low temperature and a hot calibration source indicating a brightness temperature at a high temperature to measure radio field intensities generated by the respective calibration sources. Further, as a method of measuring the radio field intensity of the calibration source, a radio wave emitted by a calibration source is received by a primary radiator, which is a radio wave introduction unit of the microwave radiometer, or a calibration source configured to emit a signal corresponding to a specific brightness temperature is used to directly introduce the signal emitted by the calibration source to an internal circuit of the receiver.

Hitherto, there has publicly been known an example in which a radio wave absorber or a resistor placed at a temperature equal to or higher than an ordinary temperature is used as the hot calibration source (for example, Patent Literature 1). The radio wave absorber and the resistor generate stable thermal noise depending on an ambient temperature, and the noise temperatures can thus correctly be calibrated by using the radio wave absorber or the resistor together with a thermometer. Meanwhile, there has publicly been known an example in which a radio wave absorber submerged in liquid nitrogen is used as the cold calibration source (for example, Patent Literature 2). The liquid nitrogen boils, and is consequently maintained at a certain low temperature (77 K under 1 atm). Therefore, the radio wave absorber submerged in the liquid nitrogen generates stable noise, and enables correct calibration of the noise temperature as with the hot calibration source.

CITATION LIST

Patent Literature

[PTL 1] JP 2004-28731 A
[PTL 2] JP 2001-506363 A

SUMMARY OF INVENTION

Technical Problem

Among the related-art methods of calibrating a microwave radiometer, in the method of stabilizing the temperature of the cold calibration source through use of the liquid nitrogen, the radio field intensity emitted from the object to be measured is stabilized, and hence the calibration method can highly precisely calibrate the microwave radiometer. However, due to a nature of the liquid nitrogen, extreme care is required to handle the liquid nitrogen, and mishandling may endanger human bodies.

Moreover, the liquid nitrogen itself cannot be stored in a simple facility, and it is thus difficult to frequently calibrate the microwave radiometer. Therefore, the calibration can actually be executed only a few times in one year. However, the noise temperature of the receiver fluctuates depending on the ambient temperature of the microwave radiometer and the elapsed time. Thus, when the frequency of execution of the calibration is low, the noise temperature of the receiver is less correctly obtained as the time elapses after a time point of the calibration, and, as a result, the precision of the brightness temperature measured by the microwave radiometer decreases.

Further, when the liquid nitrogen is used, a container filled with the liquid nitrogen is required to be held over a front portion of the primary radiator, and it is thus difficult to downsize an entire device including the cold calibration source. Still further, it is difficult, in terms of mechanical implementation, to automate the calibration method without intervention of human, and there is thus such a problem that the calibration method cannot be used at a location other than the earth ground, for example, a location in an artificial satellite. Yet further, it is required to purchase the liquid nitrogen each time the calibration is executed, and there is also such a problem that an operation cost is high.

Solution to Problem

The present invention has been made in view of the above-mentioned problems, and has an object to provide a method of calibrating a microwave radiometer capable of automatically and highly frequently performing a calibration operation without intervention of human, reducing the size of a device so as to be applicable to even a location in an artificial satellite, and reducing an operation cost by eliminating use of liquid nitrogen as a calibration source.

According to one embodiment of the present invention, there is provided a method of calibrating a microwave radiometer, the method being applied to a microwave radiometer configured to receive, by a receiver having a primary radiator connected thereto, a radio wave emitted from an object to be measured depending on a temperature of the object to be measured and to measure a brightness temperature of the object to be measured from an output signal of the receiver, in which a noise temperature $T_{rx}$ of the receiver appearing on an output side of the receiver is calibrated by observing a plurality of calibration sources having known brightness temperatures, the method including using a radio wave reflector configured to totally reflect noise radiated from an input side of the receiver as one of the plurality of calibration sources.

Advantageous Effects of Invention

Thermal radiation of the radio wave reflector configured to totally reflect the radio wave is extremely low, and the brightness temperature of the radio wave reflector itself is negligibly low. Therefore, the radio wave reflector used as the calibration source totally reflects only the noise radiated from the input side of the receiver back to the receiver, and can thus stabilize the radio field intensity input to the receiver as with a related-art cold calibration source cooled by the liquid nitrogen.

Thus, according to the method of the present invention, it is not required to use the liquid nitrogen, which is difficult to handle and obstructs downsizing of the device, and the calibration operation can automatically and highly frequently be performed without intervention of human. As a result, there can be achieved a highly precise microwave radiometer enabling an unmanned operation while keeping a high precision for a long period of time.

DESCRIPTION OF EMBODIMENTS

Referring to accompanying drawings, a detailed description is now given of a method of calibrating a microwave radiometer according to the present invention.

Figure 1:
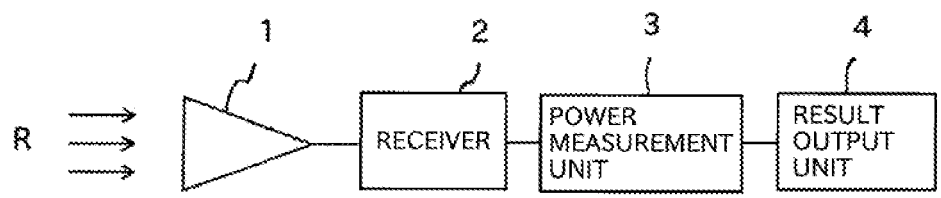
FIG. 1 is a block diagram for illustrating a basic configuration of a microwave radiometer to which a method according to the present invention is applied.

FIG. 1 is a block diagram for illustrating a basic configuration of a microwave radiometer to which the method according to the present invention is applied. A radio wave R radiated by an object to be measured is received by a primary radiator 1 serving as an antenna, and is input to a receiver 2 connected to the primary radiator 1. The receiver 2 amplifies the signal input from the primary radiator 1, and then outputs the amplified signal to a power measurement unit 3. A power density of the input signal is measured by the power measurement unit 3. A result output unit 4 connected at a subsequent stage of the power measurement unit 3 outputs the measured power density as a brightness temperature to an outside.

In the microwave radiometer configured as described above, the power density of the signal output from the receiver 2 to the power measurement unit 3 indicates the brightness temperature of the object to be measured. However, a power density of noise having generated inside the receiver 2 is superimposed as a noise temperature $T_{rx}$ on the power density of this signal. Moreover, the noise temperature $T_{rx}$ of the receiver 2 fluctuates depending on an ambient temperature and an elapsed time. Therefore, in order to correctly obtain the brightness temperature of the object to be measured from the output signal of the receiver 2, it is required to appropriately measure the noise temperature $T_{rx}$ of the receiver 2, and to cause the power measurement unit 3 to hold the noise temperature $T_{rx}$, to thereby calibrate the microwave radiometer.

Description is now given of the method of calibrating the microwave radiometer according to the present invention. In order to gain a better understanding of the method according to the present invention, description is first given of a related-art calibration method to be executed through use of a plurality of calibration sources each having a known brightness temperature.

Figure 6:
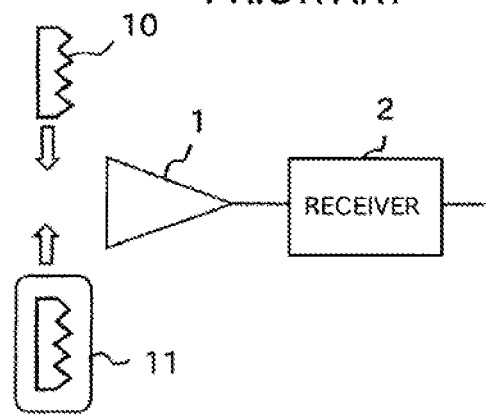
FIG. 6 is an explanatory diagram for illustrating a related-art calibration method through use of a hot calibration source and a cold calibration source.

FIG. 6 is a diagram for schematically illustrating a microwave radiometer to which the related-art calibration method is applied. This microwave radiometer includes two calibration sources 10 and 11, and each of the calibration sources 10 and 11 can be selectively moved and arranged with respect to a front surface of the primary radiator 1. The one calibration source 10 is a radio wave absorber kept at an ordinary temperature, and functions as a hot calibration source. The other calibration source 11 is a radio wave absorber submerged in liquid nitrogen, and functions as a cold calibration source. In FIG. 6, there is omitted a configuration at a subsequent stage of the receiver to which the output signal of the receiver 2 is input.

An actual brightness temperature of the hot calibration source 10 is represented by $T_{hot}$. A power density of a signal output by the receiver when the hot calibration source is observed is represented by $P_{hot}$. A proportional coefficient between the brightness temperature and the power density (power spectrum density) is represented by "a". The output signal of the receiver 2 is the actual brightness temperature $T_{hot}$ of the hot calibration source 10 superimposed on the noise temperature $T_{rx}$. Therefore, the power density $P_{hot}$ is given by the following expression when the hot calibration source 10 is observed.

$$P_{hot} = a \cdot (T_{hot} + T_{rx})$$

Similarly, an actual brightness temperature of the cold calibration source 11 is represented by $T_{cold}$. A power density of a signal output by the receiver when the cold calibration source is observed is represented by $P_{cold}$. The power density $P_{cold}$ is given by the following expression when the cold calibration source is observed.

$$P_{cold} = a \cdot (T_{cold} + T_{rx})$$

A ratio between the power density $P_{hot}$ at the time when the hot calibration source 10 is observed and the power density $P_{cold}$ at the time when the cold calibration source 11 is observed is represented by Y1. A relationship between Y1 and the noise temperature $T_{rx}$ appearing on the output side of the receiver 2 is given by Expression (1) and Expression (2).

$$Y1 = \frac{P_{hot}}{P_{cold}} = \frac{a \cdot (T_{hot} + T_{rx})}{a \cdot (T_{cold} + T_{rx})} = \frac{T_{hot} + T_{rx}}{T_{cold} + T_{rx}} \quad (1)$$

$$T_{rx} = \frac{T_{hot} - Y1 \cdot T_{cold}}{Y1 - 1} \quad (2)$$

As described above, when the brightness temperature $T_{hot}$ of the hot calibration source 10 and the brightness temperature $T_{cold}$ of the cold calibration source 11 are known, the noise temperature $T_{rx}$ on the output side of the receiver 2 is obtained from the ratio Y1 between the power densities $P_{hot}$ and $P_{cold}$ at the time when the respective calibration sources are observed. The noise temperature $T_{rx}$ fluctuates as the time elapses. Therefore, it is required to alternately observe the hot calibration source 10 and the cold calibration source 11 at short intervals, to thereby appropriately calibrate the noise temperature $T_{rx}$.

When the noise temperature $T_{rx}$ on the output side of the receiver 2 is calibrated as described above, the brightness temperature of the object to be measured can be measured.

When the object to be measured is the atmosphere, and a brightness temperature of the atmosphere is represented by $T_{sky}$, a power density $P_{sky}$ at the time when the atmosphere is observed is given by the following expression through use of the noise temperature $T_{rx}$ on the output side of the receiver 2.

$$P_{sky} = a \cdot (T_{sky} + T_{rx})$$

Meanwhile, when the hot calibration source 10 having the known brightness temperature is observed, and the power density at the observation is represented by $P_{hot}$ as described above, a ratio Y2 between the $P_{hot}$ at and the $P_{sky}$ is given by Expression (3). Moreover, Y2, $T_{hot}$, and $T_{rx}$ are known, and $T_{sky}$ can thus be obtained.

$$Y2 = \frac{P_{hot}}{P_{sky}} = \frac{a \cdot (T_{hot} + T_{rx})}{a \cdot (T_{sky} + T_{rx})} = \frac{T_{hot} + T_{rx}}{T_{sky} + T_{rx}} \quad (3)$$

As described above, the two calibration sources are used to enable the calibration of the noise temperature $T_{rx}$ on the output side of the receiver 2, and the actual brightness temperature of the object to be measured can be measured in consideration of the noise temperature $T_{rx}$. However, as described above, the cold calibration source using the liquid nitrogen has many restrictions in terms of safety, a frequency of the calibration, a cost, and the like, which has been a cause of obstructing practicality of the microwave radiometer.

Thus, in the present invention, as a method of perceiving the noise temperature $T_{rx}$ without using the liquid nitrogen for the calibration source, to thereby calibrate a microwave radiometer, there is proposed a method of reflecting the noise generated by the receiver 2 by the calibration source to return the noise back to the receiver 2 and using the output signal of the receiver 2 at this time to appropriately obtain the noise temperature $T_{rx}$.

Description is now given of the calibration method according to the present invention.

Figure 5:
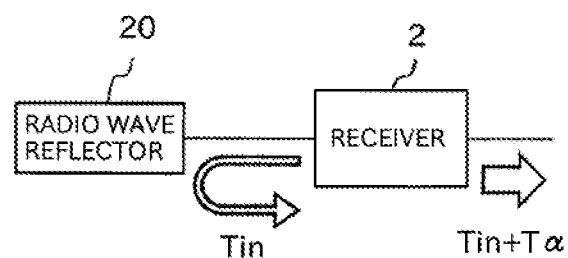
FIG. 5 is an explanatory diagram for illustrating a state in which noise appearing on an input side of a receiver is totally reflected by a radio wave reflector.

The noise emitted by the receiver 2 mainly appears on the output side of the receiver 2, but the noise also simultaneously appears on an input side at a certain ratio. As illustrated in FIG. 5, when a radio wave reflector 20 is provided for the input side of the receiver 2, the noise appearing on the input side of the receiver 2 is reflected by the radio wave reflector 20, and returns back to and input to the receiver 2. The radio wave reflector 20 is required to totally reflect the radio wave, and a reflectance thereof is required to be equal to or higher than 0.99998, that is, approximately 100%. Almost all metal plates satisfy this condition of the reflectance, and can thus be used as the radio wave reflector. For example, in consideration of a reduction in weight of the device, it is optimal to use a metal plate made of light metal, for example, aluminum.

Thermal radiation of the radio wave reflector 20 configured to totally reflect the radio wave is extremely low, and the brightness temperature of the radio wave reflector 20 itself is negligibly low. Therefore, the input signal to the receiver 2 is only a noise temperature $T_{in}$, which is reflected by the radio wave reflector and is returned back to the receiver 2. Moreover, the output signal of the receiver 2 is a signal formed of the noise temperature $T_{in}$ and the noise temperature $T_{rx}$ originally appearing on the output side of the receiver 2 superimposed on each other (see FIG. 4).

When an output ratio between the noise appearing on the output side of the receiver 2 and the noise appearing on the input side of the receiver 2 is represented by "c", and a physical radio wave reflectance of the radio wave reflector 20 itself is represented by "d", a relationship between the noise temperature $T_{in}$ retuned by the radio wave reflector 20 back to the receiver 2 and the noise temperature $T_{rx}$ on the output side of the receiver 2 is given as follows.

$$T_{in} = c \cdot d \cdot T_{rx} = b \cdot T_{rx}$$

The coefficient "b" of the expression is a ratio in magnitude between the noise temperature $T_{in}$ returned back to the input side of the receiver 2 and the noise temperature $T_{rx}$ on the output side of the receiver 2. The output ratio "c" is a value unique to the receiver, and is a value independent of the ambient temperature of the microwave radiometer. Moreover, the radio wave reflectance "d" of the radio wave reflector 20 is also a value independent of the ambient temperature. Therefore, the coefficient "b" is also a value independent of the ambient temperature of the microwave radiometer.

Thus, a power density $P_1$ of the signal output from the receiver when the radio wave reflector serving as the calibration source is observed is given by the following expression.

$$P_1 = a \cdot (c \cdot d \cdot T_{rx} + T_{rx}) = a \cdot (b \cdot T_{rx} + T_{rx})$$

The metal plate can be used as the radio wave reflector 20. The noise emitted from the input side of the receiver 2 can easily be returned back to the receiver by holding the metal plate over the front portion of the primary reflector 1. Moreover, as another specific example of the radio wave reflector 20, the input to the receiver may be short-circuited to a ground circuit as a circuit configuration, or the input to the receiver may be opened as a circuit configuration.

Meanwhile, as a second calibration source other than the radio wave reflector 20, a radio wave absorber having an actual brightness temperature T can be used as in the case of the hot calibration source 11, and is held over the front portion of the primary reflector 1, to thereby be used as the second calibration source. A reason for using the radio wave absorber as the second calibration source is to, because the noise of the receiver 2 also appears on the input side of the receiver 2 as described above, prevent the noise from being reflected by the second calibration source and then being returned back to the receiver 2. Thus, a power density $P_2$ of the signal output from the receiver 2 when the radio wave absorber is observed is given by the following expression.

$$P_2 = a \cdot (T_2 + T_{rx})$$

When a ratio between the power density $P_1$ of the signal output from the receiver 2 when the radio wave reflector 20 is observed and the power density $P_2$ of the signal output from the receiver 2 when the radio wave absorber is observed is represented by Y3, Y3 is given by Expression (4).

$$Y3 = \frac{P_1}{P_2} = \frac{a \cdot (c \cdot d \cdot T_{rx} + T_{rx})}{a \cdot (T_2 + T_{rx})} = \frac{(c \cdot d + 1) \cdot T_{rx}}{T_2 + T_{rx}} \quad (4)$$

The temperature $T_2$ of the radio wave absorber can actually be measured easily by providing a temperature sensor for the radio wave absorber. Thus, when the output ratio "c" and the reflectance "d" of the expression are known values, the noise temperature $T_{rx}$ on the output side of the receiver 2 can be derived through calculation by actually measuring the power densities $P_1$ and $P_2$.

It is required to obtain, as a known value in advance, the coefficient "b", which is a product of the output ratio "c" of the receiver 2 and the reflectance "d" of the radio wave reflector. In this case, after the hot calibration source 10 and the cold calibration source 11 are used to obtain the noise temperature $T_{rx}$ of the receiver 2, the power densities $P_1$ and $P_2$ are obtained, and the reflectance "b" is obtained as given by the above-mentioned expression. At this time, the liquid nitrogen is required in order to stabilize the temperature of the cold calibration source 11. However, no fluctuation of the reflectance "b" occurs permanently or for a period of time long enough for practical use, and hence the liquid nitrogen is not required for an ordinary use of the microwave radiometer.

As the second calibration source other than the radio wave absorber arranged over the front portion of the primary reflector 1, a resistor may be connected to the input side of the receiver, and may be used as the second calibration source. In this case, it is required to prevent the resistor from reflecting the noise appearing on the input side of the receiver 2. Therefore, the resistor is required to be a resistor having an electrical impedance matching that of the receiver.

Description is now given of embodiments of a microwave radiometer to which the method according to the present invention is applied.

Figure 2:
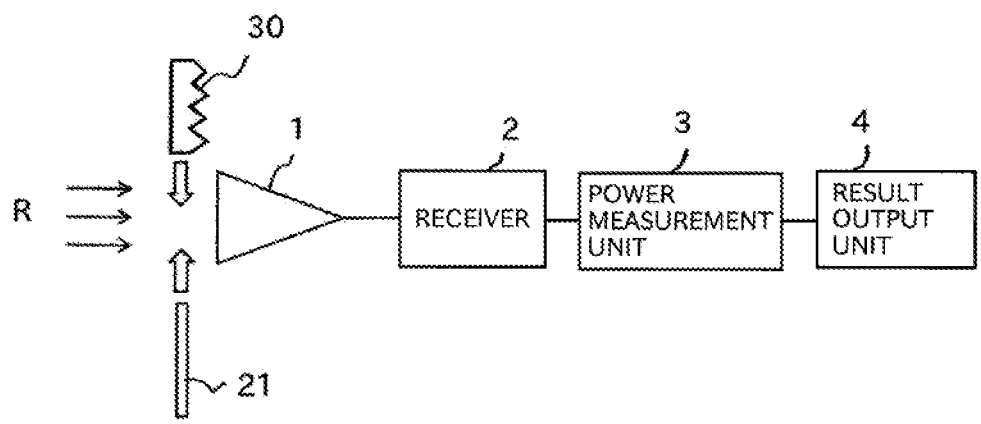
FIG. 2 is a block diagram for illustrating a first embodiment of the microwave radiometer to which the method according to the present invention is applied.

FIG. 2 is a block diagram for illustrating a first embodiment of the microwave radiometer to which the method according to the present invention is applied. Basic components of the microwave radiometer are the same as those of the microwave radiometer of FIG. 1. Therefore, the components of FIG. 2 are denoted by the same reference numerals as those of FIG. 1, and description thereof is omitted herein.

A metal plate (radio wave reflector) 21 or a radio wave absorber 30 serving as the calibration source can selectively be arranged over the front surface of the primary radiator 1. As the metal plate 21, there is used a metal material having a reflectivity equal to higher than 0.99998. Moreover, the radio wave absorber 30 is a non-reflective absorber. A temperature sensor (not shown) is provided for the radio wave absorber 30 so that a temperature $T_2$ of the radio wave absorber 30 can actually be measured from an output signal of the temperature sensor.

When the microwave radiometer in the first embodiment is to be calibrated, the radio wave absorber 30 is first arranged over the front portion of the primary radiator 1, and the power density $P_2$ of the signal output from the receiver 2 when the radio wave absorber 30 is observed is measured. After that, in place of the radio wave absorber 30, the metal plate 21 is arranged over the front portion of the primary reflector 1. The noise emitted from the input side of the receiver 2 through the primary radiator is totally reflected by the metal plate 6. The totally reflected noise is received by the primary radiator, and is then input to the receiver. After that, the power density $P_1$ of the signal output from the receiver at this time is measured.

With this configuration, the noise temperature $T_{rx}$ appearing on the output side of the receiver can be obtained through use of Expression (4). The brightness temperature of the object to be measured, which is measured by the microwave radiometer, can thus be calibrated through use of the obtained noise temperature $T_{rx}$.

The microwave radiometer in the first embodiment requires a mechanism configured to selectively arrange the radio wave absorber 30 and the metal plate 21 over the front portion of the primary radiator, but the radio wave absorber 30 and the metal plate 21 have light weights, and the mechanism configured to move the radio wave absorber 30 and the metal plate 21 can easily be implemented. Moreover, the liquid nitrogen difficult to handle is not required, and hence the calibration operation can be automated. Further, the frequency of the calibration operation can be increased, to thereby increase a measurement precision of the brightness temperature.

Figure 3:
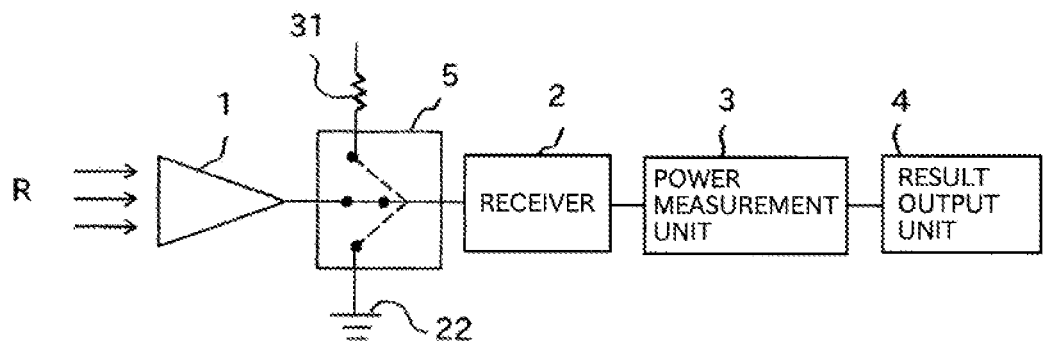
FIG. 3 is a block diagram for illustrating a second embodiment of the microwave radiometer to which the method according to the present invention is applied.

FIG. 3 is a block diagram for illustrating a second embodiment of the microwave radiometer to which the method according to the present invention is applied. Basic components of this microwave radiometer are also the same as those of the microwave radiometer of FIG. 1. Therefore, the components of FIG. 3 are denoted by the same reference numerals as those of FIG. 1, and description thereof is omitted herein.

In the second embodiment, in place of the metal plate 21 or the radio wave absorber 30 arranged over the front portion of the primary radiator 1, a switch 5 configured to switch the input to the receiver 2 is provided between the primary radiator 1 and the receiver 2. The switch 5 is configured to connect any one of the primary radiator 1, a ground circuit 22, and a resistor 31 to the input side of the receiver 2.

An electrical impedance of the resistor 31 matches that of the receiver 2. When the switch 5 is operated to connect the resistor 31 and the receiver 2 to each other, the resistor 31 functions as a non-reflective absorber, to thereby absorb the noise appearing on the input side of the receiver 2. Moreover, the resistor 31 itself outputs noise depending on the temperature $T_2$, and the noise is input to the receiver. A temperature sensor (not shown) is provided for the resistor 31 so that the temperature $T_2$ of the resistor 31 can actually be measured from an output signal of the temperature sensor.

Moreover, the input side of the receiver 2 can be short-circuited to the ground circuit 22 by operating the switch 5. When the receiver 2 is short-circuited to the ground circuit 22, the noise appearing on the input side of the receiver 2 is totally reflected by the ground circuit 22. Therefore, the ground circuit 22 functions as a radio wave reflector as with the metal plate 21 in the first embodiment.

When the microwave radiometer in the second embodiment is to be calibrated, the switch 5 is first operated to connect the resistor 31 and the receiver 2 to each other, to thereby input the noise output from the resistor 31 to the receiver 2. The power density $P_2$ of the signal output from the receiver 2 at this time is measured. After that, the switch 5 is operated to short-circuit the receiver 2 to the ground circuit 22. The noise emitted from the input side of the receiver 2 is totally reflected by the ground circuit 22, to thereby input the totally reflected noise to the receiver 2. After that, the power density $P_1$ of the signal output from the receiver 2 at this time is measured.

With this configuration, the noise temperature $T_{rx}$ appearing on the output side of the receiver 2 can be obtained through use of Expression (4). The brightness temperature of the object to be measured, which is measured by the microwave radiometer, can be calibrated through use of the obtained noise temperature $T_{rx}$.

In the microwave radiometer in the second embodiment, the radio wave reflector and the radio wave absorber serving as the calibration sources can be selected by the operation of the switch 5, and hence the configuration of the device can be simplified compared with that of the first embodiment. Thus, the implementation thereof is easy, and the simple configuration contributes to downsizing and weight reduction of the microwave radiometer. Moreover, the liquid nitrogen difficult to handle is not required as in the first embodiment, and hence the calibration operation can be automated. Further, the frequency of the calibration operation can be increased, to thereby increase the measurement precision of the brightness temperature.

Figure 4:
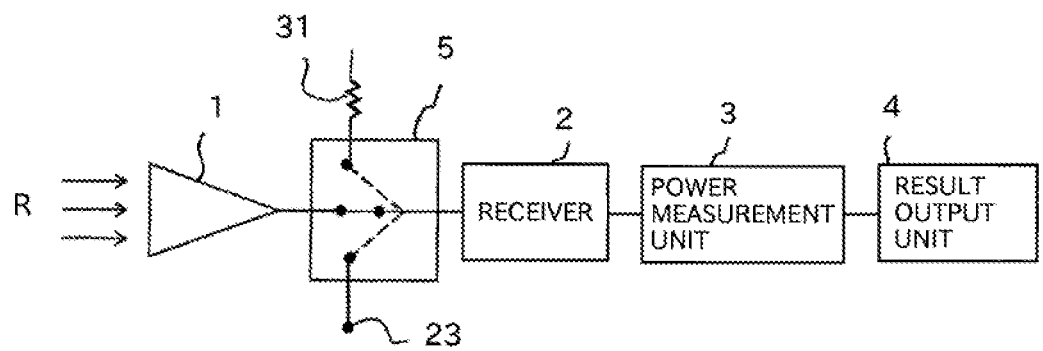
FIG. 4 is a block diagram for illustrating a third embodiment of the microwave radiometer to which the method according to the present invention is applied.

FIG. 4 is a block diagram for illustrating a third embodiment of the microwave radiometer to which the method according to the present invention is applied. The microwave radiometer in the third embodiment has substantially the same configuration as that in the second embodiment. A difference is that the receiver 2 can be connected to an open end 23 in place of the ground circuit 22 in the second embodiment.

That is, the switch 5 is configured to connect any one of the primary radiator 1, the open end 23, and the resistor 31 to the input side of the receiver 2. The input side of the receiver 2 can be short-circuited to the open end 23 by operating the switch 5. When the receiver 2 is short-circuited to the open end 23, the noise appearing on the input side of the receiver 2 is totally reflected by the open end 23. Therefore, the open end 23 functions as a radio wave reflector as with the ground circuit 22 in the second embodiment.

When the microwave radiometer in the third embodiment is to be calibrated, the switch 5 is first operated to connect the resistor 31 and the receiver 2 to each other, to thereby input the noise output from the resistor 31 to the receiver 2. The power density $P_2$ of the signal output from the receiver 2 at this time is measured. After that, the switch 5 is operated to short-circuit the receiver 2 to the open end 23. The noise emitted from the input side of the receiver 2 is totally reflected by the open end 23, to thereby input the totally reflected noise to the receiver 2. After that, the power density $P_1$ of the signal output from the receiver 2 at this time is measured.

With this configuration, the noise temperature $T_{rx}$ appearing on the output side of the receiver 2 can be obtained through use of Expression (4). The brightness temperature of the object to be measured, which is measured by the microwave radiometer, can be calibrated through use of the obtained noise temperature $T_{rx}$.

Also in the microwave radiometer in the third embodiment, the configuration of the device can be simplified as in the second embodiment. Thus, the implementation thereof is thus easy, and the simple configuration contributes to the downsizing and the weight reduction of the microwave radiometer. Moreover, the liquid nitrogen difficult to handle is not required as in the first embodiment and the second embodiment, and hence the calibration operation can be automated. Further, the frequency of the calibration operation can be increased, to thereby increase the measurement precision of the brightness temperature.

In the calibration method according to the present invention described above, the radio wave absorber and the radio wave reflector serving as the calibration sources can be freely combined for use.

Moreover, the power measurement unit 3 in each embodiment can also be implemented as an analog circuit. Moreover, after the output signal of the receiver 2 is converted from an analog signal to a digital signal, the power density may be measured through digital signal processing. Further, the output signal of the receiver 2 may be detected by an analog circuit, and, after a detected analog signal is converted to a digital signal, the power density may be measured through digital signal processing.

The invention claimed is:

1. A method of calibrating a microwave radiometer, the method being applied to a microwave radiometer, the method comprising:
   receiving, by a primary radiator, a radio wave emitted from an object to be measured depending on a temperature of the object to be measured;
   amplifying, by a receiver, a signal input from the primary radiator and to output the amplified signal, the receiver being connected to the primary radiator;
   measuring, by a power management unit, a power density of the output signal of the receiver; and
   outputting, by a result output unit, the power density measured by the power measurement unit as a brightness temperature of the object to be measured,
   wherein a noise temperature of the receiver appearing on an output side of the receiver is calibrated by observing a plurality of calibration sources provided at a preceding stage of an input side of the receiver, and
   wherein a calibration source having a known brightness temperature and a radio wave reflector configured to totally reflect noise radiated from the receiver to the input side of the receiver are used in combination as the plurality of calibration sources.

2. The method of calibrating the microwave radiometer according to claim 1, wherein the radio wave reflector is a metal plate covering the primary radiator.

3. The method of calibrating the microwave radiometer according to claim 1, wherein the radio wave reflector is a ground circuit, the ground circuit and the primary radiator being configured to selectively be connected to the receiver.

4. The method of calibrating the microwave radiometer according to claim 1, wherein the radio wave reflector is an open end, the open end and the primary radiator being configured to selectively be connected to the receiver.

5. The method of calibrating the microwave radiometer according to claim 1, further comprising:
   absorbing, by a radio wave absorber, the noise radiated from the input side of the receiver the calibration source having the known brightness temperature;

when a unique ratio between the noise temperature $T_{rx}$ appearing on the output side of the receiver and a noise temperature appearing on the input side of the receiver is represented by "c", and a reflectance of the radio wave reflector is represented by "d", observing the radio wave reflector to measure a power density $P_1$ of the output signal of the receiver;

observing the radio wave absorber to measure a power density $P_2$ of the output signal of the receiver and a temperature $T_2$ of the radio wave absorber; and using the following expression to calibrate the noise temperature $T_{rx}$ of the receiver:

$$\frac{P_1}{P_2} = \frac{(cd+1) \cdot T_{rx}}{T_2 + T_{rx}}.$$

6. A microwave radiometer, comprising:

a primary radiator configured to receive a radio wave emitted from an object to be measured depending on a temperature of the object to be measured;

a receiver, which is connected to the primary radiator, and is configured to amplify a signal input from the primary radiator and to output the amplified signal;

a power measurement unit configured to measure a power density of the output signal of the receiver; and a result output unit configured to output the power density measured by the power measurement unit as a brightness temperature of the object to be measured, wherein the microwave radiometer further comprises, at a preceding stage of an input side of the receiver, a plurality of calibration sources configured to function as references for calibrating a noise temperature of the receiver appearing on an output side of the receiver, and wherein the microwave radiometer includes, as the plurality of calibration sources, a calibration source having a known brightness temperature and a radio wave reflector configured to totally reflect noise radiated from the receiver to the input side of the receiver.

* * * * *